(12) United States Patent
Packiarajan (10) Patent No.: US 11,549,738 B2
(45) Date of Patent: Jan. 10, 2023

(54) METHOD OF MANUFACTURING AN ENCLOSURE FOR A TRANSPORT REFRIGERATION UNIT, TRANSPORT REFRIGERATION UNIT AND TRANSPORT UNIT

(71) Applicant: THERMO KING LLC, Minneapolis, MN (US)

(72) Inventor: Selvam Packiarajan, Eden Prairie, MN (US)

(73) Assignee: THERMO KING LLC, Minneapolis, MN (US)

( * ) Notice: Subject to any disclaimer, the term of this patent is extended or adjusted under 35 U.S.C. 154(b) by 571 days.

(21) Appl. No.: 16/565,031

(22) Filed: Sep. 9, 2019

(65) Prior Publication Data
US 2019/0390891 A1    Dec. 26, 2019

Related U.S. Application Data

(62) Division of application No. 15/142,592, filed on Apr. 29, 2016, now abandoned.

(51) Int. Cl.
*F25D 11/00* (2006.01)
*B29C 70/34* (2006.01)
(Continued)

(52) U.S. Cl.
CPC ............ *F25D 11/003* (2013.01); *B29C 41/00* (2013.01); *B29C 41/08* (2013.01); *B29C 41/20* (2013.01);
(Continued)

(58) Field of Classification Search
CPC ......... F25D 11/003; F25D 23/067; B60P 3/20
See application file for complete search history.

(56) References Cited

U.S. PATENT DOCUMENTS 3,631,580 A    1/1972    Swartz
3,940,468 A    2/1976    Tunstall
(Continued)

FOREIGN PATENT DOCUMENTS

DE    102009022542    12/2010
DE    102015208945    11/2016
(Continued)

OTHER PUBLICATIONS

WO-2014040983-A1 Translation (Year: 2014).*
(Continued)

*Primary Examiner* — David J Teitelbaum
(74) *Attorney, Agent, or Firm* — Hamre, Schumann, Mueller & Larson, P.C.

(57) ABSTRACT

A method of manufacturing a transport refrigeration unit is provided. The method includes providing an enclosure including an outer layer and a supporter. Providing the enclosure includes supplying one of a first material and a second material to a mold. This also includes supplying the other of the first material and the second material on the one of the first material and the second material that is supplied to the mold. Also, this includes curing the first material and the second material integrally that are supplied to the mold. The first material forms into the outer layer and the second material forms into the supporter. The second material includes a plurality of reinforcing fibers.

10 Claims, 9 Drawing Sheets

(51) Int. Cl.

| | | |
|---|---|---|
| *F25D 19/00* | (2006.01) | |
| *B29C 41/22* | (2006.01) | |
| *B29C 41/00* | (2006.01) | |
| *B29C 41/20* | (2006.01) | |
| *B29C 41/08* | (2006.01) | |
| *B60P 3/20* | (2006.01) | |
| *B60H 1/32* | (2006.01) | |
| *B60H 1/00* | (2006.01) | |
| *F25D 23/06* | (2006.01) | |
| *B62D 33/04* | (2006.01) | |
| *B29K 105/12* | (2006.01) | |
| *B29L 31/00* | (2006.01) | |
| *B29K 69/00* | (2006.01) | |
| *B29K 23/00* | (2006.01) | |
| *B29K 75/00* | (2006.01) | |
| *B29C 41/36* | (2006.01) | |
| *B29L 9/00* | (2006.01) | |
| *B29K 25/00* | (2006.01) | |

(52) U.S. Cl.
CPC ............ *B29C 41/22* (2013.01); *B29C 70/345* (2013.01); *B60H 1/00364* (2013.01); *B60H 1/3229* (2013.01); *B60H 1/3232* (2013.01); *B60P 3/20* (2013.01); *B62D 33/048* (2013.01); *F25D 19/003* (2013.01); *F25D 23/067* (2013.01); *B29C 41/365* (2013.01); *B29K 2023/18* (2013.01); *B29K 2025/08* (2013.01); *B29K 2069/00* (2013.01); *B29K 2075/00* (2013.01); *B29K 2105/12* (2013.01); *B29L 2009/00* (2013.01); *B29L 2031/7622* (2013.01); *F25D 2323/06* (2013.01); *F25D 2400/18* (2013.01)

(56) References Cited

U.S. PATENT DOCUMENTS

| | | |
|---|---|---|
| 4,051,290 A | 9/1977 | Jutte et al. |
| 4,078,395 A | 3/1978 | Crowe et al. |
| 4,182,134 A | 1/1980 | Viegas et al. |
| 4,310,192 A | 1/1982 | Fitzgerald |
| 4,349,643 A | 9/1982 | Mohiuddin |
| 4,356,230 A | 10/1982 | Emanuel et al. |
| 4,551,986 A | 11/1985 | Anderson et al. |
| 4,610,835 A | 9/1986 | Ghavamikia |
| 4,615,057 A | 10/1986 | Favreau |
| 4,727,728 A | 3/1988 | Brown |
| 4,781,876 A | 11/1988 | Kia |
| 4,902,557 A | 2/1990 | Rohrbacher |
| 4,959,189 A | 9/1990 | Rohrbacher et al. |
| 5,000,903 A | 3/1991 | Matzinger et al. |
| 5,051,310 A | 9/1991 | Horn et al. |
| 5,087,405 A | 2/1992 | Maker |
| 5,639,536 A | 6/1997 | Yamazaki et al. |
| 5,662,996 A | 9/1997 | Jourquin et al. |
| 5,927,090 A * | 7/1999 | Ladendorf ............ F25D 19/003 296/24.35 |
| 6,117,384 A * | 9/2000 | Laurin ..................... B28B 3/06 156/244.11 |
| 6,132,662 A | 10/2000 | Preisler et al. |
| 6,440,546 B1 | 8/2002 | Fields et al. |
| 6,620,371 B1 | 9/2003 | Winget et al. |
| 6,696,160 B2 | 2/2004 | Partusch et al. |
| 6,745,470 B2 | 6/2004 | Foster et al. |
| 7,445,836 B2 | 11/2008 | Kaman et al. |
| 8,033,521 B2 | 10/2011 | Khan et al. |
| 8,807,628 B1 | 8/2014 | Pfaff |
| 9,925,727 B2 | 3/2018 | Wagner et al. |
| 2007/0269671 A1 | 11/2007 | Hirschfelder et al. |
| 2009/0126854 A1 | 5/2009 | Khan |
| 2010/0007045 A1 | 1/2010 | Hsu et al. |
| 2012/0003454 A1* | 1/2012 | Younes ................. B29C 70/086 264/259 |
| 2012/0148803 A1* | 6/2012 | Schleiermacher .... B29C 70/086 428/156 |
| 2015/0123419 A1* | 5/2015 | Werum ................ B62D 29/046 296/193.06 |
| 2016/0144542 A1 | 5/2016 | Doan et al. |
| 2018/0345601 A1 | 12/2018 | Packiarajan et al. |

FOREIGN PATENT DOCUMENTS

| | | | | |
|---|---|---|---|---|
| GB | 2010169 | 6/1979 | | |
| JP | S57129731 | 8/1982 | | |
| JP | S59202834 | 11/1984 | | |
| JP | H05131489 | 5/1993 | | |
| JP | H05329882 | 12/1993 | | |
| WO | WO-2014040983 A1 * | 3/2014 | ......... B60H 1/00371 |

OTHER PUBLICATIONS

Thermo King: "Specification Sheet; Precedent S-600"; Ingersoll Rand, pp. 1-2.
Hui Boon Kwa: "Ineos Styrolution Helps Seoyon E-HWA Bring Brilliance to the Front Grill of Hyundai's New Kia K5"; Ineos Styrolution, Jun. 2016, XP-002782637, Retrieved from the Internet: https://www.ineos-styrolution.com/INTERSHOP/static/WFS/Styrolution-Portal_Site/-/Styrolution-Portal/it_IT/News%20and%20media/download/Hyundai_PR_17_06_2016.pdf.
Leonhard Kurz Stiftung & Co: "Insert Molding by Leonhard Kurz", Sep. 2016, XP002782636, retrieved from the Internet: https://www.youtube.com/watch?v=fM2mX18pfsk.
U.S. Appl. No. 15/611,066, filed Jun. 1, 2017, titled "Manufacturing Method for an Aesthetic Structural Part and an Aesthetic Structural Part", 20 pages.

* cited by examiner

METHOD OF MANUFACTURING AN ENCLOSURE FOR A TRANSPORT REFRIGERATION UNIT, TRANSPORT REFRIGERATION UNIT AND TRANSPORT UNIT

FIELD

Embodiments of this disclosure relate generally to manufacturing an enclosure for a transport refrigeration unit. More specifically, the embodiments relate to a transport refrigeration unit and a transport unit.

BACKGROUND

Conventionally, a transport refrigeration unit (TRU) is used to control a temperature inside a transport unit (e.g., a container, a trailer). The TRU is generally mounted on one side of the transport unit where conditioned air is blown into an internal space of the refrigerated transport unit. The transport refrigeration unit has an enclosure and refrigeration components (e.g., a compressor, a condenser coil, an expansion device, an evaporator coil, etc.). The refrigeration components are accommodated by the enclosure.

SUMMARY

Embodiments of this disclosure relate generally to a manufacturing a transport refrigeration unit. More specifically, the embodiments relate to a transport refrigeration unit and a transport unit.

In one embodiment, a method of manufacturing a transport refrigeration unit is provided. The method includes providing an enclosure including an outer layer and a supporter. Providing the enclosure includes supplying one of a first material and a second material to a mold. This also includes supplying the other of the first material and the second material on the one of the first material and the second material that is supplied to the mold. Also, this includes curing the first material and the second material integrally that are supplied to the mold. The first material forms into the outer layer and the second material forms into the supporter. The second material includes a plurality of reinforcing fibers.

In another embodiment, a transport refrigeration unit is provided. The transport refrigeration unit includes an enclosure defining an inner space and a plurality of refrigeration components disposed in the inner space. The enclosure includes an outer layer, and a supporter directly laminated to the outer layer. The supporter includes a plurality of reinforcing fibers. The supporter is disposed between the inner space and the outer layer, and the supporter directly faces at least a part of the refrigeration components.

In yet another embodiment, a refrigerated transport unit is provided. The refrigerated transport unit includes a transport unit and the transport refrigeration unit described above mounted on the transport unit.

An advantage of these embodiments is that the structural strength of the enclosure can be increased since the supporter is directly laminated to the outer layer, and the supporter includes the reinforcing fibers. Further, in these embodiments, the supporter includes the reinforcing fiber raised from the main layer. Hence, the structural strength of the enclosure can be increased. The increased structural strength of the enclosure can be obtained without compromising weight, cost, and quality.

Further, in these embodiments, the supporter is directly laminated to the outer layer. Hence, the supporter and the enclosure do not need to be handled separately. This can reduce number of parts of the transport refrigeration unit, reduce labor/assembly time/cost, and reduce structural disintegration issue.

Further, in these embodiments, the surface layer showing the image is formed by forming the surface layer on the mold. Hence, quality of cosmetic surface of the enclosure can be improved. In these embodiments, forming the surface layer and curing the first material and the second material can be conducted through one mold process. Therefore, operating cost for manufacturing the enclosure can be reduced.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a manufacturing a transport refrigeration unit. More specifically, the embodiments relate to a transport refrigeration unit and a transport unit.

Figure 1:
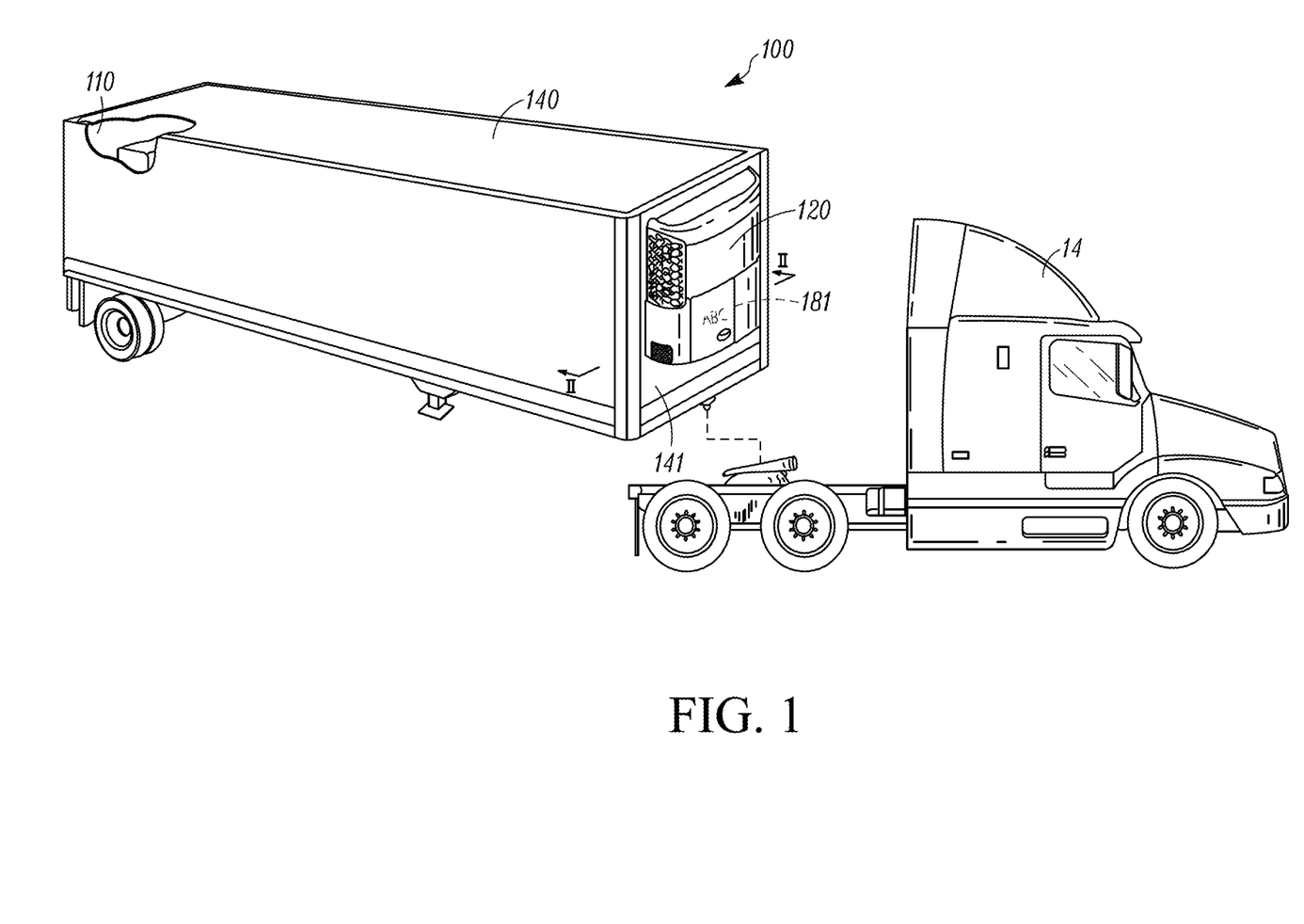
FIG. 1 is a perspective view of a refrigerated transport unit, according to one embodiment.

FIG. 1 is a perspective view of a refrigerated transport unit 100, according to one embodiment. The refrigerated transport unit 100 shown in FIG. 1 comprises a transport refrigeration unit (TRU) 120 and a transport unit 140.

The transport refrigeration unit 120 controls an environmental condition (e.g., temperature, humidity, atmosphere, etc.) within an internal space 110 of the transport unit 140. The transport refrigeration unit 120 is mounted on the transport unit 140. Specifically, in the illustrated embodiment, the transport refrigeration unit 120 is mounted on a front wall 141 of the transport unit 140. The transport refrigeration unit 120 blows conditioned air into the internal space 110 of the transport unit 140. In the embodiment shown in FIG. 1, the refrigerated transport unit 100 is a container that can be attached to a tractor 14. In some embodiments, the refrigerated transport unit 100 can be a container (e.g., a container on a flat car, an intermodal container, a ship board container, an air cargo container, etc.), a truck, a box car, or other similar transport unit.

Figure 2:
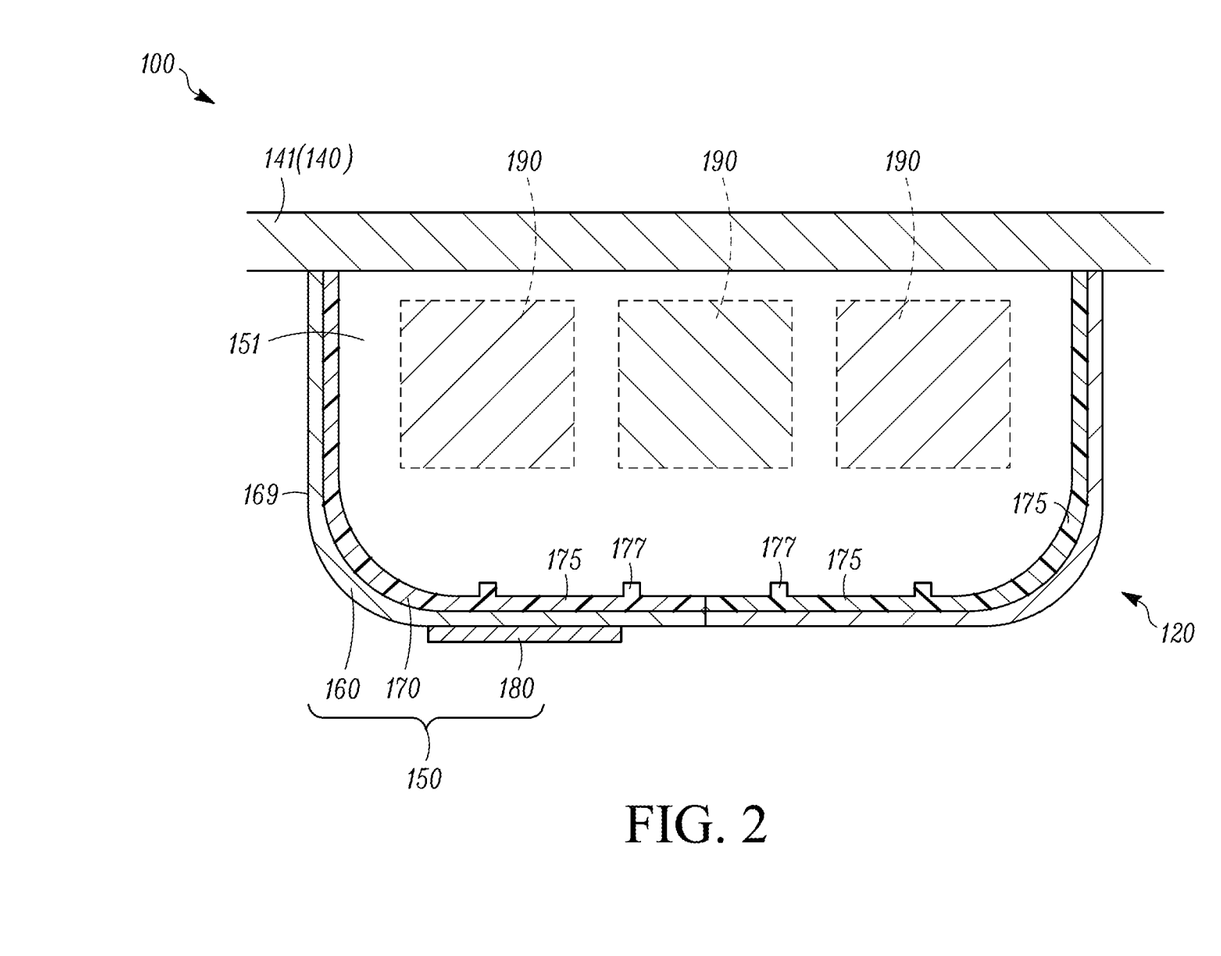
FIG. 2 is a schematic cross-sectional view taken along lines II-II in FIG. 1.

FIG. 2 is a schematic cross-sectional view taken along lines II-II in FIG. 1. As shown in FIG. 2, the transport refrigeration unit 120 comprises an enclosure 150, and optionally a plurality of refrigeration components 190. The enclosure 150 includes doors, covers, and other parts. The refrigeration components 190 are disposed in an inner space 151 defined by the enclosure 150. The refrigeration components 190 are accommodated by the enclosure 150. Each of the refrigeration components 190 can be, for example, a compressor, a condenser coil, an expansion device, an evaporator coil, etc.

Figure 3:
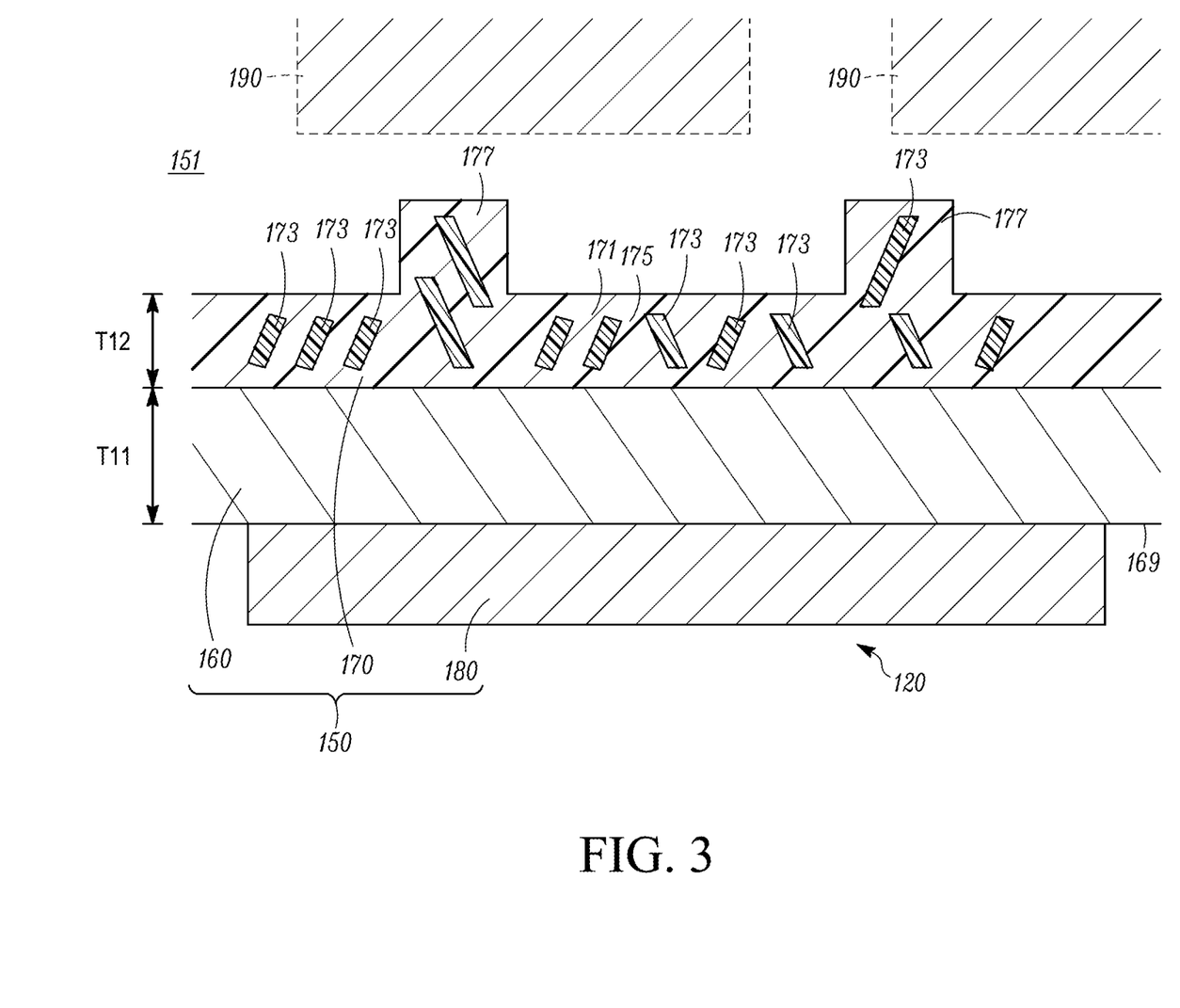
FIG. 3 is an enlarged view of the transport refrigeration unit shown in FIG. 2.

FIG. 3 is an enlarged view of the transport refrigeration unit 120 shown in FIG. 2. As shown in FIG. 3, the enclosure 150 includes an outer layer 160, a supporter 170, and a surface layer 180.

The outer layer 160 constitutes, with the surface layer 180 in this embodiment, a cosmetic part of the enclosure 150. The outer layer 160 can be made of, for example, plastic such as Acrylonitrile Butadiene Styrene (ABS), Thermoplastic Olefins (TPO), Acrylonitrile Styrene Acrylate (ASA), and Polycarbonate/Polybutylene Terephthalate (PC/PBT). The thickness T11 of the outer layer 160 can be, but is not limited to, 1 mm to 10 mm (typically 2 mm to 4 mm). The outer layer 160 prevents the supporter 170 from being visible from outside of the enclosure 150. The outer layer 160 includes an outer surface 169. The outer surface 169 faces to the opposite side to the inner space 151 of the enclosure 150.

The supporter 170 is directly laminated to the outer layer 160. The supporter 170 provides structural strength to the enclosure 150. The supporter 170 is disposed between the inner space 151 of the enclosure 150 and the outer layer 160 of the enclosure 150. The supporter 170 defines a part of the inner space 151 of the enclosure 150. The supporter 170 directly faces at least a part of the refrigeration components 190. The supporter 170 includes a base material portion 171 and a plurality of reinforcing fibers 173.

The base material portion 171 can be made of, for example, a resin such as polyurethane. The base material portion 171 is held in contact with the outer layer 160. The base material portion 171 is exposed to the inner space 151 of the enclosure 150. The reinforcing fibers 173 are mixed in the base material portion 171. In this embodiment, the reinforcing fibers 173 include long fibers. Each of the long fibers is 3 mm to 40 mm (typically 6 mm to 25 mm) in length. In this embodiment, the reinforcing fibers 173 are glass fibers or carbon fibers. The reinforcing fibers can be approximately parallel to the outer layer 160, or cannot be parallel to the outer layer 160.

As shown in FIG. 3, the supporter 170 includes a main layer 175 and a reinforcing structure 177. In this embodiment, the main layer 175 is directly laminated to the outer layer 160. The thickness T12 of the main layer 175 can be, but is not limited to, 1 mm to 10 mm (typically 2 mm to 4 mm). The reinforcing structure 177 is raised from the main layer 175 away from the outer layer 160 and the surface layer 180 and toward a front wall of the transport unit (e.g., the front wall 141 of the transport unit 140). The reinforcing structure 177 can include rib patterns. In this embodiment, each of the main layer 175 and the reinforcing structure 177 is formed by the base material portion 171 and the reinforcing fibers 173.

The surface layer 180 is formed on the outer layer 160. Specifically, the surface layer 180 is formed on the outer surface 169 of the outer layer 160. The outer layer 160 is disposed between the surface layer 180 of the enclosure 150 and the inner space 151 of the enclosure 150. The surface layer 180 can be made of, for example, plastic such as Acrylonitrile Butadiene Styrene (ABS), Thermoplastic Olefins (TPO), and Acrylonitrile Styrene Acrylate (ASA). The surface layer 180 can be formed by painting or disposing a film. Returning to FIG. 1, the surface layer 180 can display an optional image 181. The image 181 can be, for example, at least one of a character, a mark, a logo, etc. For example, the image 181 shown in FIG. 1 includes characters "ABC". The image 181 is visible from the opposite side of the outer layer 160.

The structure having an outer layer, a supporter, and a surface layer described in these embodiments can be applied to any of doors, covers, and other parts of the enclosure 150.

Figure 4:
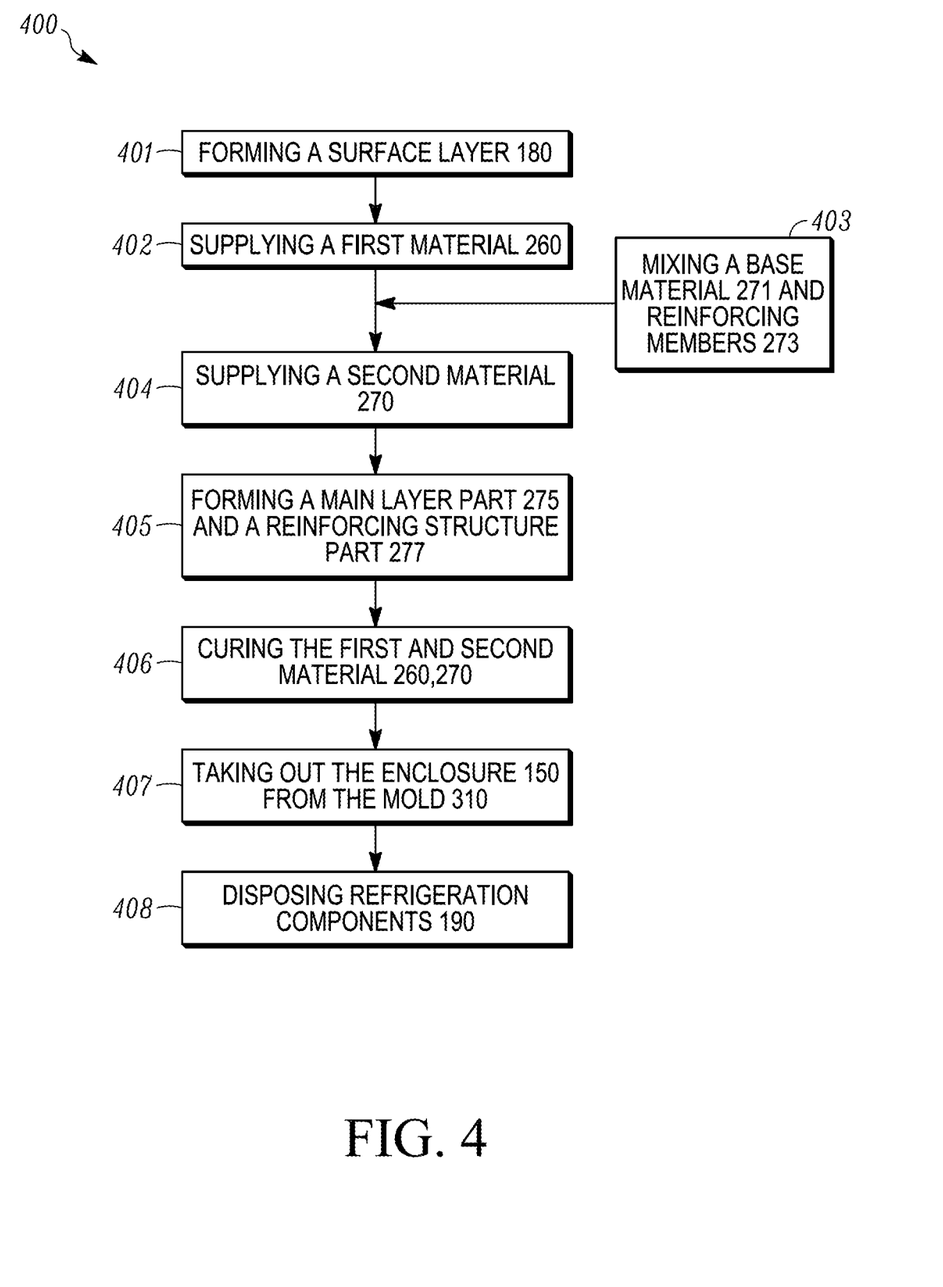
FIG. 4 is a flowchart of a method of manufacturing a transport refrigeration unit, according to one embodiment.

A method for manufacturing a transport refrigeration unit is explained below with respect to FIGS. 4-9. FIG. 4 is a flowchart of a method 400 of manufacturing a transport refrigeration unit, according to one embodiment. Each of FIGS. 5-9 is a sectional view of a transport refrigeration unit at one point during the manufacturing method shown in FIG. 4, according to one embodiment.

Figure 5:
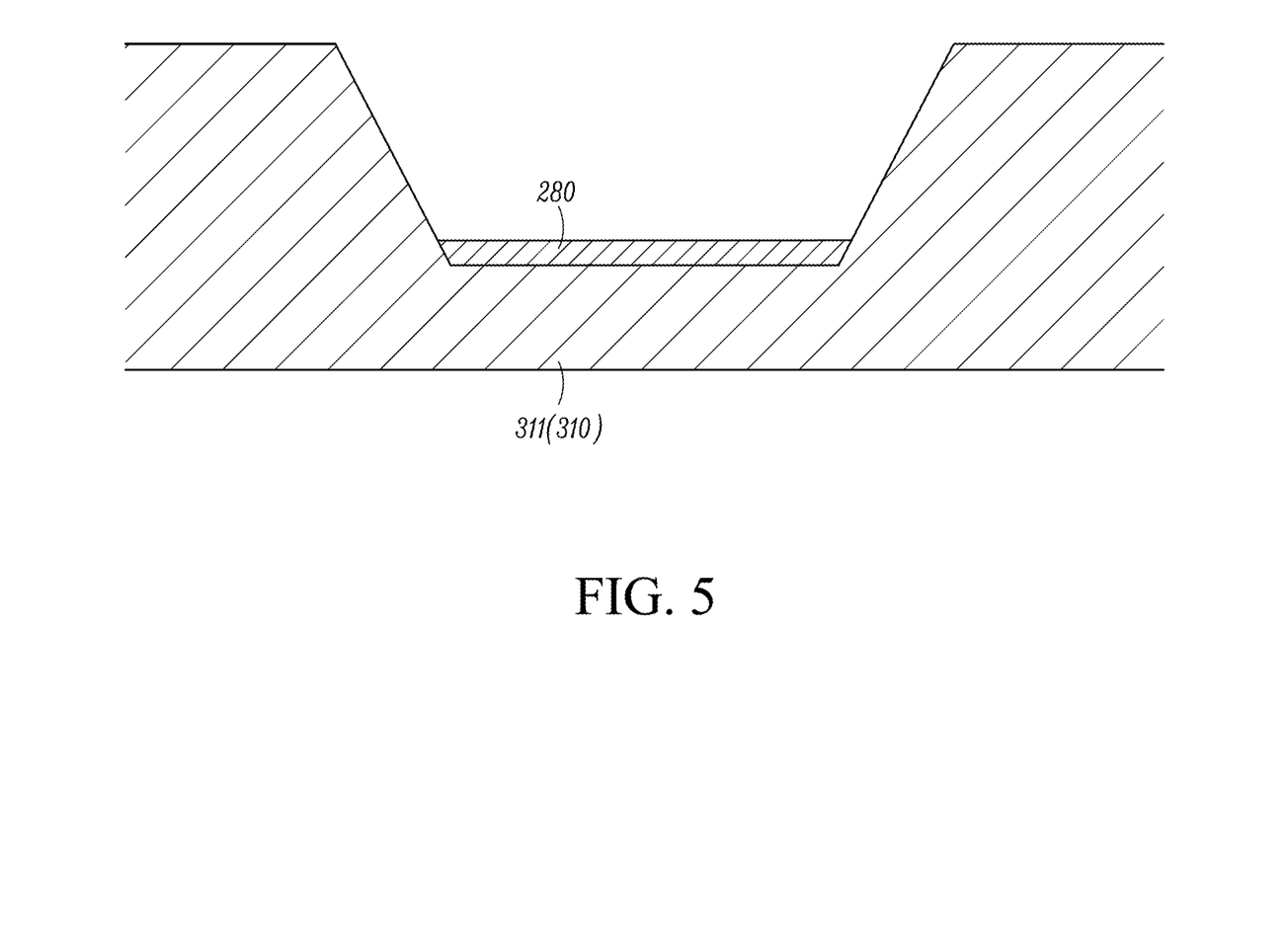
FIG. 5 is a sectional view of a transport refrigeration unit at one point during the manufacturing method shown in FIG. 4, according to one embodiment.
Figure 6:
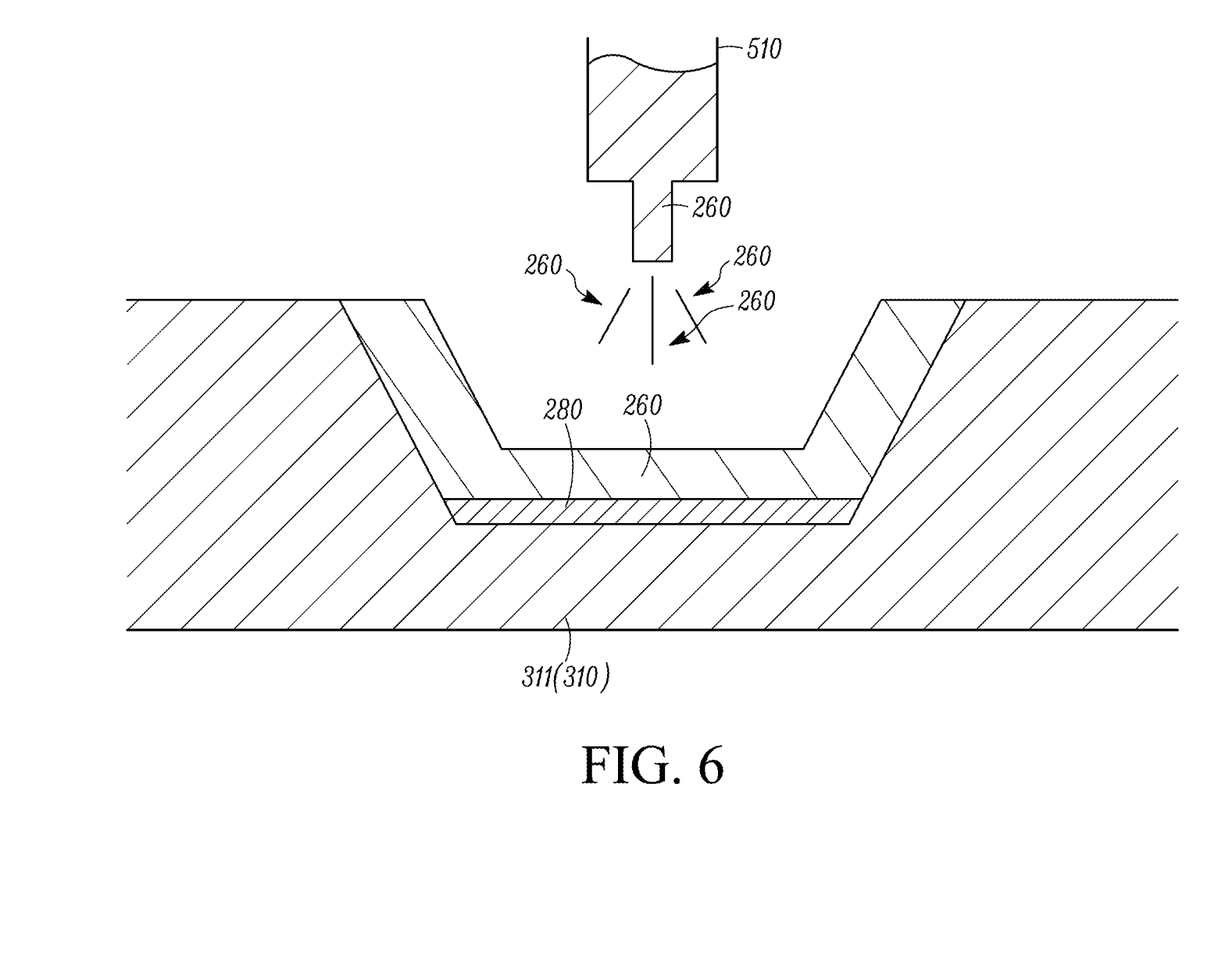
FIG. 6 is a sectional view of a transport refrigeration unit at another point during the manufacturing method shown in FIG. 4, according to one embodiment.

As shown in FIG. 5, a first mold part 311 of a mold 310 is prepared. In this embodiment, the first mold part 311 is a female mold part. Then, a surface layer 280 is formed on the first mold part 311 of the mold 310 (see 401 in FIG. 4). The surface layer 280 can be made of, for example, plastic such as Acrylonitrile Butadiene Styrene (ABS), Thermoplastic Olefins (TPO), and Acrylonitrile Styrene Acrylate (ASA). The surface layer 280 can optionally display an image (e.g., a character, a mark, a logo, etc.) as discussed above regarding the surface layer 180. The surface layer 280 can be painted onto the first mold part 311. Alternatively, the surface layer 280 can be formed on the first mold part 311 by disposing a film on the first mold part 311. The film to be disposed on the first mold part 311 can optionally include the image to be displayed (e.g., the image 181 shown in FIG. 1).

Then, one of a first material 260 and a second material 270 is supplied to a mold 310. In the embodiment shown in FIG. 6, the first material 260 is supplied on the first mold part 311 of the mold 310 (see 402 in FIG. 4). In the illustrated example in FIG. 6, the first material 260 in a container 510 is sprayed on the first mold part 311. The first material 260 can be, for example, plastic such as Acrylonitrile Butadiene Styrene (ABS), Thermoplastic Olefins (TPO), Acrylonitrile Styrene Acrylate (ASA), and Polycarbonate/Polybutylene Terephthalate (PC/PBT). In this embodiment, supplying the first material 260 to the mold 310 can include supplying the first material 260 onto the surface layer 280.

Figure 7:
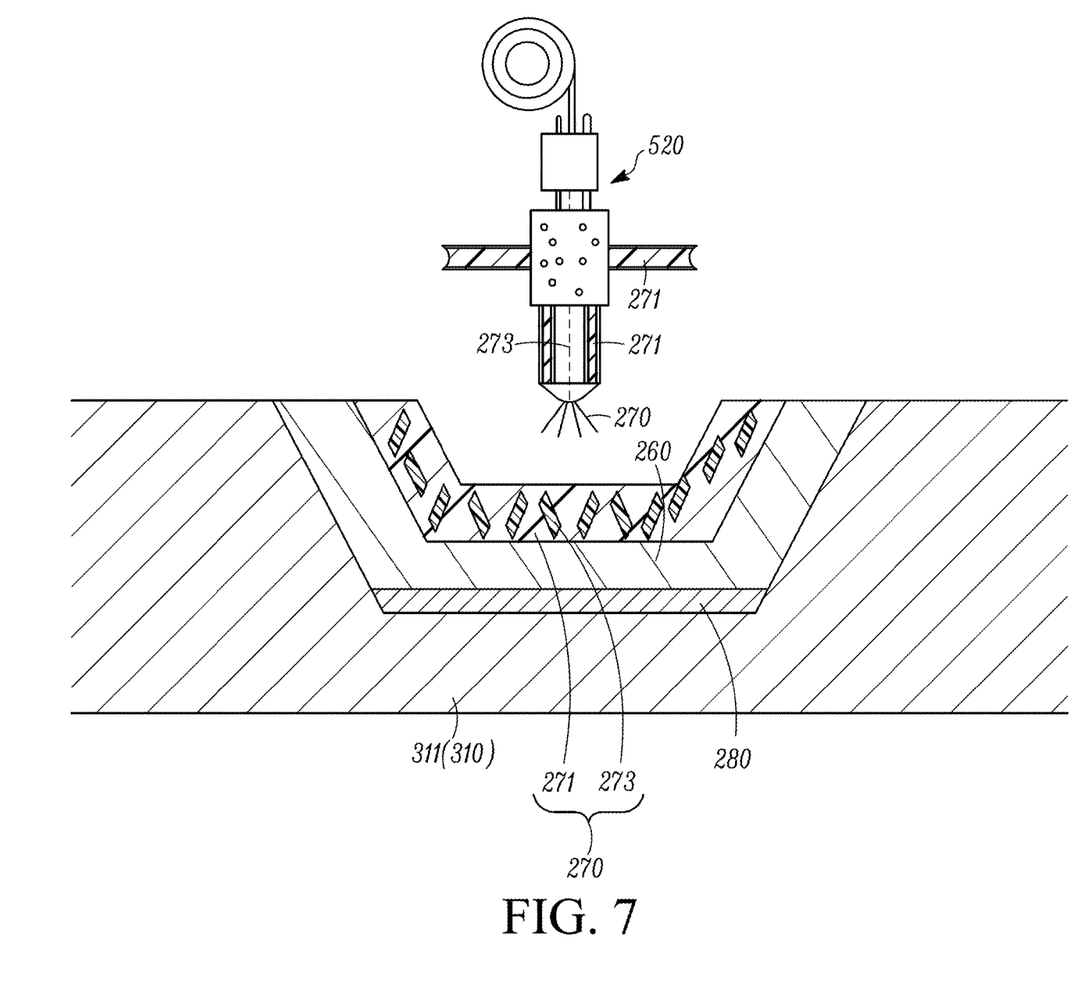
FIG. 7 is a sectional view of a transport refrigeration unit at yet another point during the manufacturing method shown in FIG. 4, according to one embodiment.

As shown in FIG. 7, a base material 271 and reinforcing fibers 273 are mixed (see 403 in FIG. 4). In the illustrated example in FIG. 7, the base material 271 and the reinforcing fibers 273 are mixed by a robotic system 520. The mixture of the base material 271 and the reinforcing fibers 273 forms the second material 270. The base material 271 can be, for example, a resin such as polyurethane. In this embodiment, the reinforcing fibers 273 include long fibers. Each of the long fibers is 3 mm to 40 mm (typically 6 mm to 25 mm) in length. In this embodiment, the reinforcing fibers 273 are glass fibers.

In some embodiments, mixing a base material and reinforcing fibers can be conducted prior to supplying a first material to a mold or prior to preparing a mold.

Then, the other of the first material 260 and the second material 270 is supplied on the one of the first material 260 and the second material 270 that is supplied to the mold 310. In the embodiment shown in FIG. 7, the second material 270 is supplied on the first material 260 that is supplied on the first mold part 311 of the mold 310 (see 404 in FIG. 4). Specifically, in the illustrated example in FIG. 7, the second material 270 is sprayed on the first material 260 by a robotic system (e.g., the robotic system 520 or a robotic system different from the robotic system 520).

Figure 8:
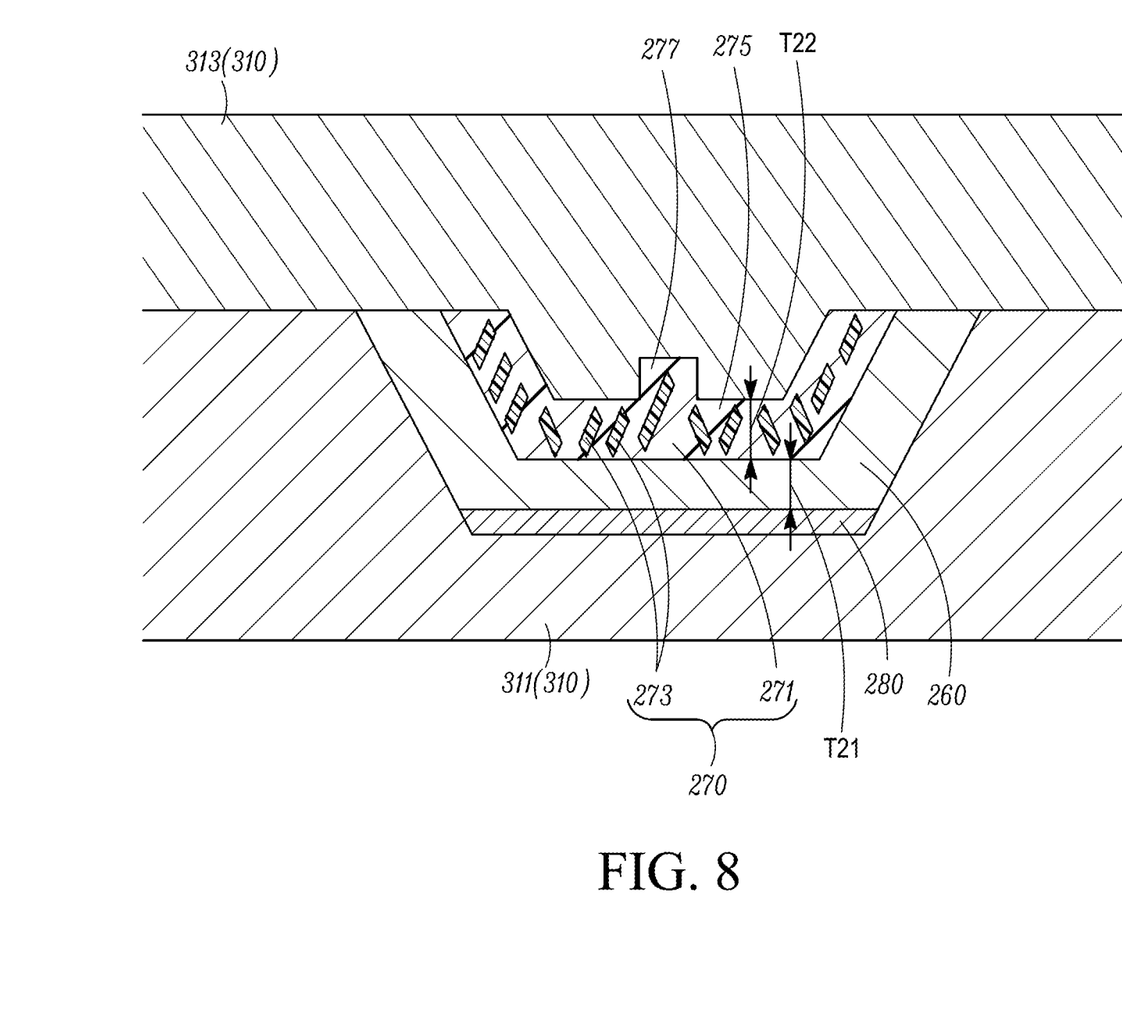
FIG. 8 is a sectional view of a transport refrigeration unit at a different point during the manufacturing method shown in FIG. 4, according to one embodiment.

Then, as shown in FIG. 8, a second mold part 313 of the mold 310 is disposed on the first mold part 311 of the mold 310. In this embodiment, the second mold part 313 is a male mold part. The second mold part 313 and the first mold part 311 of the mold 310 hold the surface layer 280, the first material 260, and the second material 270 between the second mold part 313 and the first mold part 311. Thus, the mold 310 forms a main layer part 275 of the second material 270 and a reinforcing structure part 277 of the second material 270 in the mold 310 (see 405 in FIG. 4). The main layer part 275 is directly laminated to the first material 260. The thickness T22 of the main layer part 275 can be, but is not limited to, 1 mm to 10 mm (typically 2 mm to 4 mm), while the thickness 121 of the first material 260 can be, but is not limited to, 1 mm to 10 mm (typically 2 mm to 4 mm). The reinforcing structure part 277 is raised from the main layer part 275.

Then, the first material 260 and the second material 270 that are supplied to the mold 310 are cured integrally to form an integral structure (see 406 in FIG. 4). In this embodiment, the first material 260, the main layer part 275, and the reinforcing structure part 277 are cured integrally to form an integral structure. Thus, the first material 260 forms into the outer layer 160 (see above), and the second material 270 forms into the supporter 170 (see above). The main layer part 275 forms into the main layer 175 (see above), and the reinforcing structure part 277 forms into the reinforcing structure 177 (see above). The surface layer 280 forms into the surface layer 180 (see above).

Figure 9:
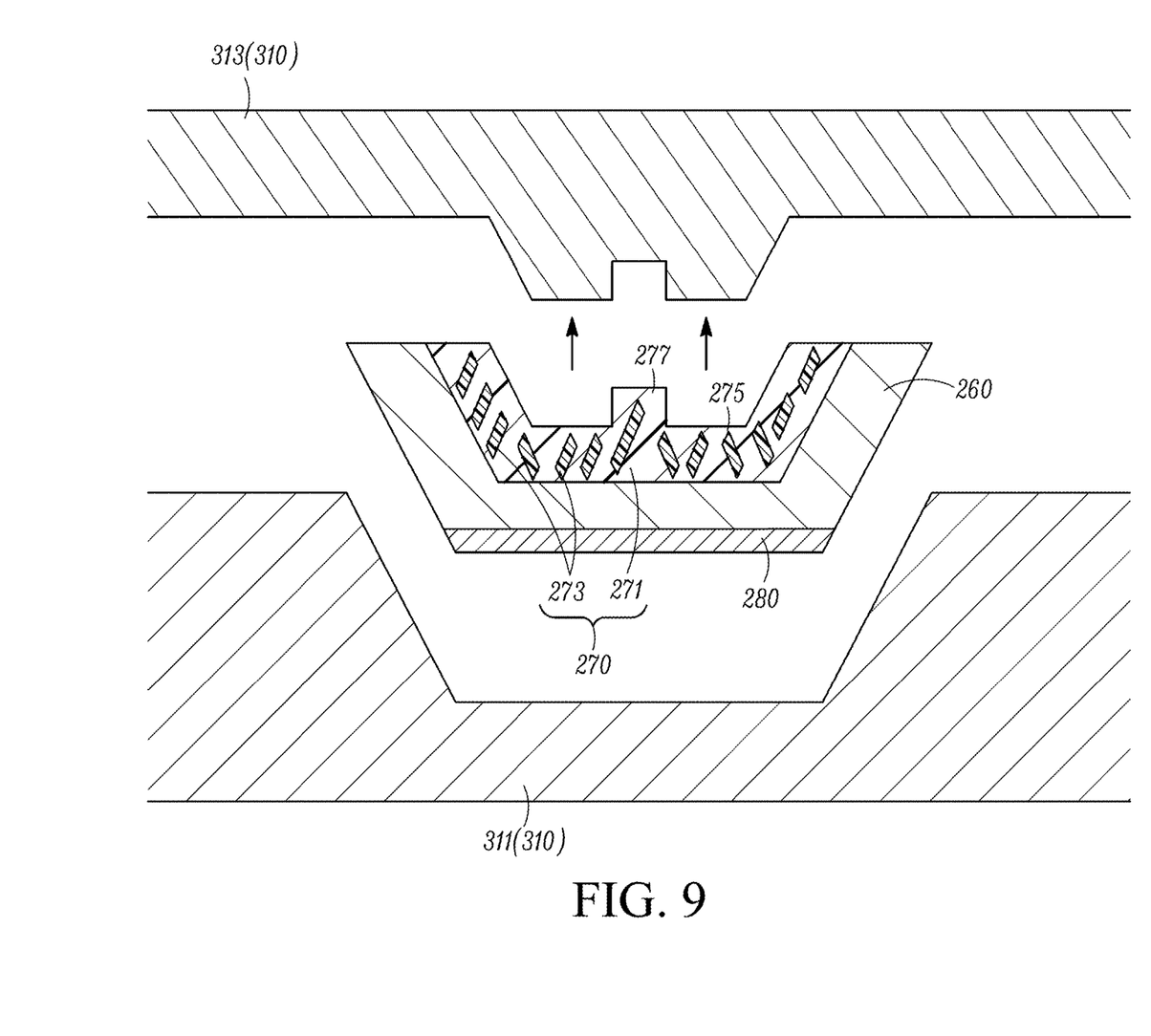
FIG. 9 is a sectional view of a transport refrigeration unit at another point during the manufacturing method shown in FIG. 4, according to one embodiment.

Then, as shown in FIG. 9, the enclosure 150 is taken out from the mold 310 (see 407 in FIG. 4). By these processes, the enclosure 150 including the outer layer 160 and the supporter 170 is prepared.

Then, a plurality of refrigeration components (e.g., the refrigeration components 190 shown in FIG. 2) are disposed in the inner space 151 defined by the enclosure 150 (see 408 in FIG. 4). It is to be appreciated that the transport refrigeration unit 120 shown in FIG. 2 can be manufactured using the method 400.

In another embodiment, the second material 270 can be supplied on a first mold of the mold, and then the first material 260 can be supplied on the second material 270 that is supplied to the first mold. Then, the first material 260 and the second material 270 that are supplied to the mold 310 can be cured to form an integral structure.

An advantage of these embodiments is that the structural strength of the enclosure 150 can be increased since the supporter 170 is directly laminated to the outer layer 160, and the supporter 170 includes the reinforcing fibers 173. Further, in these embodiments, the supporter 170 includes the reinforcing fiber 173 raised from the main layer 175. Hence, the structural strength of the enclosure 150 can be increased. The increased structural strength of the enclosure 150 can be obtained without compromising weight, cost, and quality.

Further, in these embodiments, the supporter 170 is directly laminated to the outer layer 160. Hence, the supporter 170 and the enclosure 150 do not need to be handled separately. This can reduce number of parts of the transport refrigeration unit 120, reduce labor/assembly time/cost, and reduce structural disintegration issue.

Further, in these embodiments, the surface layer 180 showing the image 181 is formed by forming the surface layer 280 on the mold 310 (i.e., the surface layer 180 is formed by in mold process). Hence, quality of cosmetic surface of the enclosure 150 can be improved. In these embodiments, forming the surface layer 280 and curing the first material 260 and the second material 270 can be conducted through one mold process. Therefore, operating cost for manufacturing the enclosure 150 can be reduced.

Aspects

It is noted that any of aspects 1-6, 7-12, and 13 can be combined.

Aspect 1. A method of manufacturing a transport refrigeration unit, comprising providing an enclosure including an outer layer and a supporter, wherein the providing the enclosure includes: supplying one of a first material and a second material to a mold; supplying the other of the first material and the second material on the one of the first material and the second material that is supplied to the mold; and curing the first material and the second material integrally that are supplied to the mold, the first material forming into the outer layer and the second material forming into the supporter, and wherein the second material includes a plurality of reinforcing fibers.

Aspect 2. The method of aspect 1, wherein the reinforcing fibers include long fibers, and a length of each of the long fibers is 3 mm to 40 mm.

Aspect 3. The method of any of aspects 1-2, wherein the providing the enclosure includes mixing the reinforcing fibers and a base material to form the second material, and the base material is polyurethane.

Aspect 4. The method of any of aspects 1-3, wherein the providing the enclosure includes forming, by the mold, a main layer part of the second material and a reinforcing structure part of the second material, the main layer part being directly laminated to the first material, and the reinforcing structure part being raised from the main layer part, and the curing the first material and the second material includes curing the first material, the main layer part, and the reinforcing structure part integrally.

Aspect 5. The method of aspect 4, wherein the main layer part has a thickness of 1 mm to 10 mm, and the outer layer has a thickness of 1 mm to 10 mm.

Aspect 6. The method of any of aspects 1-5, further comprising forming a surface layer on the mold, the surface layer displaying an image, wherein the supplying the first material to the first mold includes supplying the first material onto the surface layer.

Aspect 7. A transport refrigeration unit, comprising:
an enclosure defining an inner space; and
a plurality of refrigeration components disposed in the inner space,
wherein the enclosure includes an outer layer, and a supporter directly laminated to the outer layer, the supporter including a plurality of reinforcing fibers, and
wherein the supporter is disposed between the inner space and the outer layer, and the supporter directly faces at least a part of the refrigeration components.

Aspect 8. The transport refrigeration unit of aspect 7, wherein the reinforcing fibers include long fibers, and a length of each of the long fibers is 3 mm to 40 mm.

Aspect 9. The transport refrigeration unit of any of aspects 7-8, wherein the supporter includes a base material portion, the reinforcing fibers being mixed in the base material portion, and the base material portion is made of polyurethane.

Aspect 10. The transport refrigeration unit of any of aspects 7-9, wherein the supporter includes a main layer directly laminated to the outer layer, and a reinforcing structure raised from the main layer away from the outer layer.

Aspect 11. The transport refrigeration unit of aspect 10, wherein the main layer has a thickness of 1 mm to 10 mm, and the outer layer has a thickness of 1 mm to 10 mm.

Aspect 12. The transport refrigeration unit of any of aspects 7-11, wherein the enclosure includes a surface layer formed on the outer layer, the outer layer disposed between the inner space and the surface layer, and the surface layer displays an image.

Aspect 13. A transport unit, comprising:
a refrigerated transport unit; and
the transport refrigeration unit of any of aspects 7-12 mounted on the transport unit.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:

1. A transport refrigeration unit, comprising:
an enclosure defining an inner space; and
a plurality of refrigeration components disposed in the inner space,
wherein the enclosure includes an outer layer, and a supporter directly laminated to the outer layer, the supporter including a plurality of reinforcing fibers,
wherein the supporter is disposed between the inner space and the outer layer, and the supporter directly faces at least a part of the refrigeration components,
wherein the supporter includes a main layer and a reinforcing structure,
wherein the main layer is directly laminated to the outer layer,
wherein the enclosure includes a surface layer formed on the outer layer, the outer layer disposed between the inner space and the surface layer,
wherein the reinforcing structure is a protrusion that is raised from a back surface of the main layer away from the outer layer and the surface layer and towards a front wall of a transport unit, and
wherein both the main layer and the reinforcing structure includes a base material portion and the reinforcing fibers.

2. The transport refrigeration unit of claim 1, wherein the reinforcing fibers include long fibers, and a length of each of the long fibers is 3 mm to 40 mm.

3. The transport refrigeration unit of claim 1, wherein the reinforcing fibers being mixed in the base material portion, and the base material portion is made of polyurethane.

4. The transport refrigeration unit of claim 1, wherein the main layer has a thickness of 1 mm to 10 mm, and the outer layer has a thickness of 1 mm to 10 mm.

5. The transport refrigeration unit of claim 1, wherein the surface layer displays an image.

6. The transport refrigeration unit of claim 1, wherein the plurality of reinforcing fibers includes long fibers.

7. The transport refrigeration unit of claim 1, wherein the outer layer excludes the plurality of reinforcing fibers.

8. A refrigerated transport unit, comprising:
a transport unit; and
a transport refrigeration unit mounted on the transport unit,
wherein the transport refrigeration unit includes:
an enclosure defining an inner space; and
a plurality of refrigeration components disposed in the inner space,
wherein the enclosure includes an outer layer, and a supporter directly laminated to the outer layer, the supporter including a plurality of reinforcing fibers,
wherein the supporter is disposed between the inner space and the outer layer, and the supporter directly faces at least a part of the refrigeration components,
wherein the supporter includes a main layer and a reinforcing structure,
wherein the main layer is directly laminated to the outer layer,
wherein the enclosure includes a surface layer formed on the outer layer, the outer layer disposed between the inner space and the surface layer,
wherein the reinforcing structure is a protrusion that is raised from a back surface of the main layer away from the outer layer and the surface layer and towards a front wall of a transport unit, and
wherein both the main layer and the reinforcing structure includes a base material portion and the reinforcing fibers.

9. The refrigerated transport unit of claim 8, wherein the plurality of reinforcing fibers includes long fibers.

10. The refrigerated transport unit of claim 8, wherein the outer layer excludes the plurality of reinforcing fibers.

* * * * *